United States Patent
Jiang et al.

(10) Patent No.: US 10,803,626 B2
(45) Date of Patent: Oct. 13, 2020

(54) LARGE SCALE ONLINE LOSSLESS ANIMATED GIF PROCESSOR

(71) Applicant: Microsoft Technology Licensing, LLC, Redmond, WA (US)

(72) Inventors: Yurong Jiang, Sunnyvale, CA (US); Ivaylo G. Dimitrov, Mountain View, CA (US); Sining Ma, Sunnyvale, CA (US); Si Lao, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/022,126

(22) Filed: Jun. 28, 2018

(65) Prior Publication Data

US 2020/0005493 A1 Jan. 2, 2020

(51) Int. Cl.
  *G06T 9/00* (2006.01)
  *G06T 13/80* (2011.01)

(52) U.S. Cl.
  CPC ............... *G06T 9/00* (2013.01); *G06T 13/80* (2013.01)

(58) Field of Classification Search
  CPC .. G06T 9/00; G06T 13/80; G06T 7/00; G06T 11/00; G06T 11/60; H04N 1/32101; H04N 1/32128; H04N 1/32144; H04N 1/32149; H04N 1/32277; H04N 1/41; H04N 19/507
  See application file for complete search history.

(56) References Cited

U.S. PATENT DOCUMENTS

| 6,300,959 B1 | 10/2001 | Gabler et al. |
| 6,720,979 B1 | 4/2004 | Shrader |
| 7,010,570 B1 * | 3/2006 | Boies ............ G06Q 30/018 705/317 |

(Continued)

FOREIGN PATENT DOCUMENTS

KR 100531856 B1 11/2005

OTHER PUBLICATIONS

J. Niederst. Learning Web Design: A Beginner's Guide to HTML, Graphics & Beyond. O'Reilly Digital Studio. O'Reilly Media, Inc., Sebastapol, CA, second edition, 2003, pp. 1-12. (Year: 2003).*

(Continued)

*Primary Examiner* — Ke Xiao
*Assistant Examiner* — Andrew Shin
(74) *Attorney, Agent, or Firm* — Hickman Palermo Becker Bingham LLP

(57) ABSTRACT

Systems and techniques for a large scale online lossless animated GIF processor are described herein. In an example, a lossless animated GIF processor is adapted to receive an animated GIF image and decode a first and second frame of the animated GIF image, wherein the decoding identifies a disposal method for each frame. The lossless animated GIF processor may determine an optimized disposal method for the second frame based on transparency pixels in the second frame and an overlap estimation between the second frame and the first frame. The lossless animated GIF processor may encode the second frame with the optimized disposal method. The lossless animated GIF processor may be further adapted to identify pixels in an area of interest, designate pixels outside the area of interest as transparent, and encode the area of interest and the pixels designated as transparent for the second frame.

14 Claims, 8 Drawing Sheets

(56) References Cited

U.S. PATENT DOCUMENTS

2005/0122427 A1\* 6/2005 Hougui ................. H04N 7/122
    348/453
2009/0089710 A1    4/2009 Wood et al.
2019/0379926 A1\* 12/2019 Vari ............... H04N 21/234381

OTHER PUBLICATIONS

"Gifsicle: Command-Line Animated GIFS", On Github, [Online]. Retrieved from the Internet: <URL: http://www.lcdf.org/gifsicle/>, (Accessed May 22, 2018), 4 pgs.

\* cited by examiner

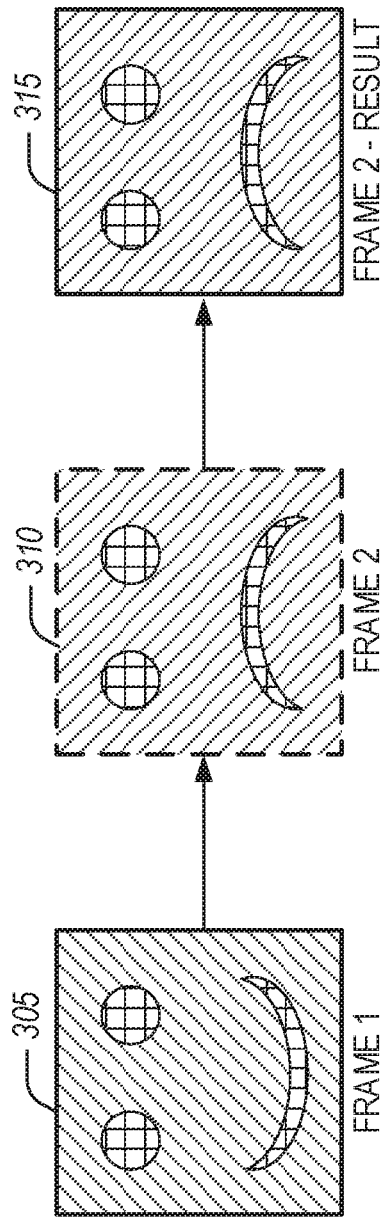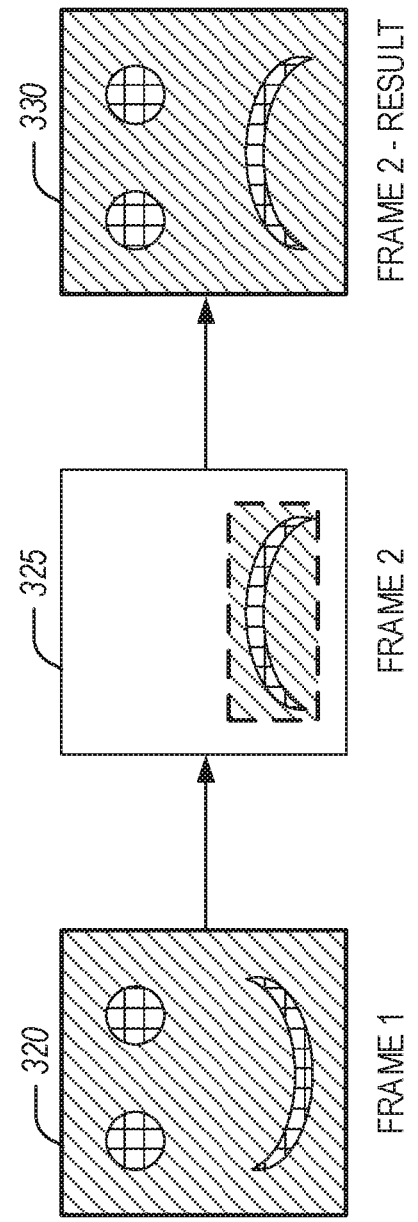

LARGE SCALE ONLINE LOSSLESS ANIMATED GIF PROCESSOR

TECHNICAL FIELD

Embodiments described herein generally relate to optimizing the encoding of animated Graphics Interchange Format (GIF) images.

BACKGROUND

An animated GIF is a digital image presentation similar to classic animation where a set of images are shown in quick succession to give the appearance of movement for the objects in the images. For example, an animated GIF of a bird flying may include a set of images of the bird at different stages of the wings flapping. The animated. GIF is comprised of a series of images to create the animation, thus data size for an animated GIF may be the size of one image multiplied by the number of images or frames which comprise the animated GIF. Therefore, storing a large number of animated GIFs may require a lot of storage space.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 3A-3D illustrate the four types of disposal methods used with animated GIFs, in accordance with some embodiments.

DETAILED DESCRIPTION

The GIF format supports up to 8 bits per pixel for each image, which allows a single image to use up to 256 different colors (24-bit RGB color space) with the reference to its own palette. GIF format supports animations, or animated GIFs, where each frame uses a separate palette of up to 256 colors. Due to the palette limitation, GIF format does not support high quality color photographs, but has found popularity on social networks due to its simplicity and animation support. GIF images are compressed using the Lempel-Ziv-Welch (LZW) lossless data compression technique to reduce the file size without degrading the visual quality.

An animated GIF image is comprised of a sequence of image frames, that when displayed in succession produce the effect of movement occurring in the image. Thus, to store the data for an animated GIF involves storing each of the image frames comprising the animated GIF. While the data size of an animated GIF is larger than a single image, the typical size of an animated GIF is not prohibitively large. But when a hosting platform, such as for a web service or social network, stores animated GIFs for their users, the storage required can become quite large. Additionally, hosting platforms may convert and store each animated GIF in multiple image sizes to provide support for the multiple platforms used by its users, such as mobile devices, laptops, televisions, and high definition monitors.

In many animated GIFs, the differences from one frame to the next may be a limited amount of the overall frame. For example, in the animation of a ball bouncing up and down, most of the background may not change from frame to frame. Thus, for each image frame comprising an animated GIF, it may not be necessary to store the whole image frame. To reduce the data size of an animated GIF, disposal methods may be implemented between each frame of the animated GIF. A disposal method provides instruction for what to do with a previous frame when a new frame is displayed. Transparency indicates which pixels should be transparent in a new frame, thus allowing the pixels of the previous frame which are in the positions of the transparent frames to be displayed. Combining transparency with the new frame and a disposal method (essentially a retention method) for the previous frame may limit the amount of each frame to be stored, the data size for the animated GIF may be reduced.

Figure 1:
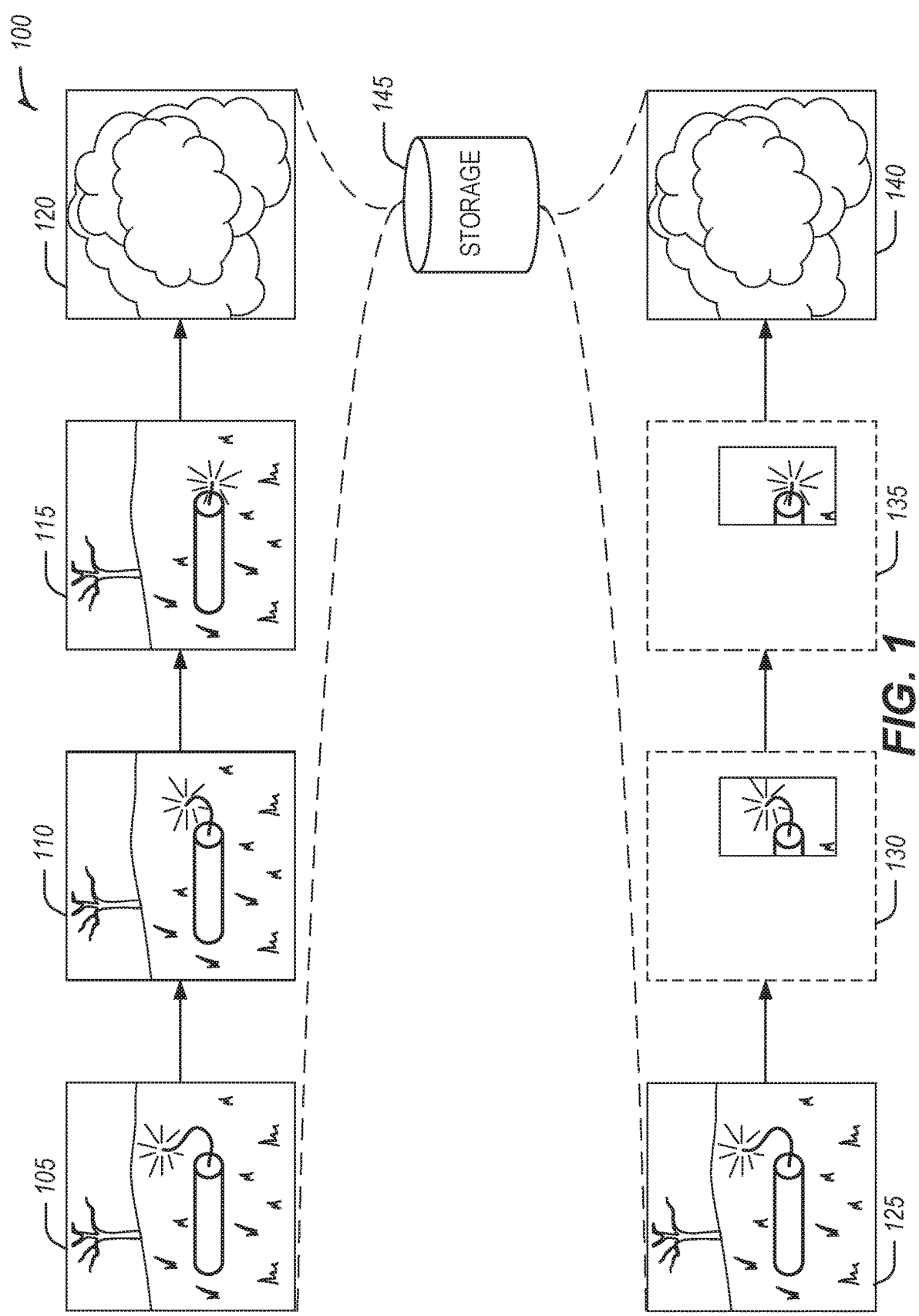
FIG. 1 illustrates an example for frames of an animated GIF of a stick of dynamite burning and exploding, in accordance with some embodiments.

FIG. 1 illustrates an example 100 for frames of an animated GIF of a stick of dynamite burning and exploding, in accordance with some embodiments. Image frames 105, 110, 115, 120 and image frames 125, 130, 135, 140, both are representative frames of the same animated GIF for stick of dynamite burning and exploding. Image frames 105, 110, 115, 120 represent the animated GIF using full size images for each frame of the animation. Image frames 125, 130, 135, 140 represent the animated GIF where a disposal method has been implemented.

Image frame 105 is the initial frame of the animated GIF and depicts an image of a stick of dynamite with a burning wick laying on a grassy field with a tree in the background. Image frame 110 depicts the same scene with the wick having burned shorter than in image frame 105, but the dynamite stick, the grassy field, and the tree remain the same. The same is true for image frame 115, where the wick has now burned even shorter than in image frame 110. Finally, in image frame 120, the dynamite has exploded and all that is visible is the explosion with the grassy field and tree not visible. To save the animated. GIF of image frames 105, 110, 115, 120 in a storage system 145, such as a database, may include retaining the image for four full size images, even though some of the images include the same data.

Image frame 125 is the initial frame of the animated GIF and depicts the same image as image frame 105. However, for the next frame in the sequence, a disposal method is implemented reducing the size of image frame 130. As noted in the description of image frame 110, most of image frame 110 is the same as image frame 105. Thus, for image frame 130, only the portion of the image which is different from the initial image frame 125 retained. For image frame 130, this is the area around the burning wick as the wick is shorter that it was in image frame 125. The same image retention occurs for image frame 135, as the wick is shorter than in image frame 130, but the rest of the image (as seen in image frame 115) remains the same as in the initial image frame 125. Finally, for image frame 140, the full image is used as none of image frame 140 includes portions of the previous image frames. The data size to store the animated. GIF of image frame 125, 130, 135, 140 in storage system 145 is reduced from the data size needed for image frames 105, 110, 115, 120 as only image frame 125 and 140 are full size images while image frame 130 and image frame 135 are less than a quarter of a full size image.

Figure 2:
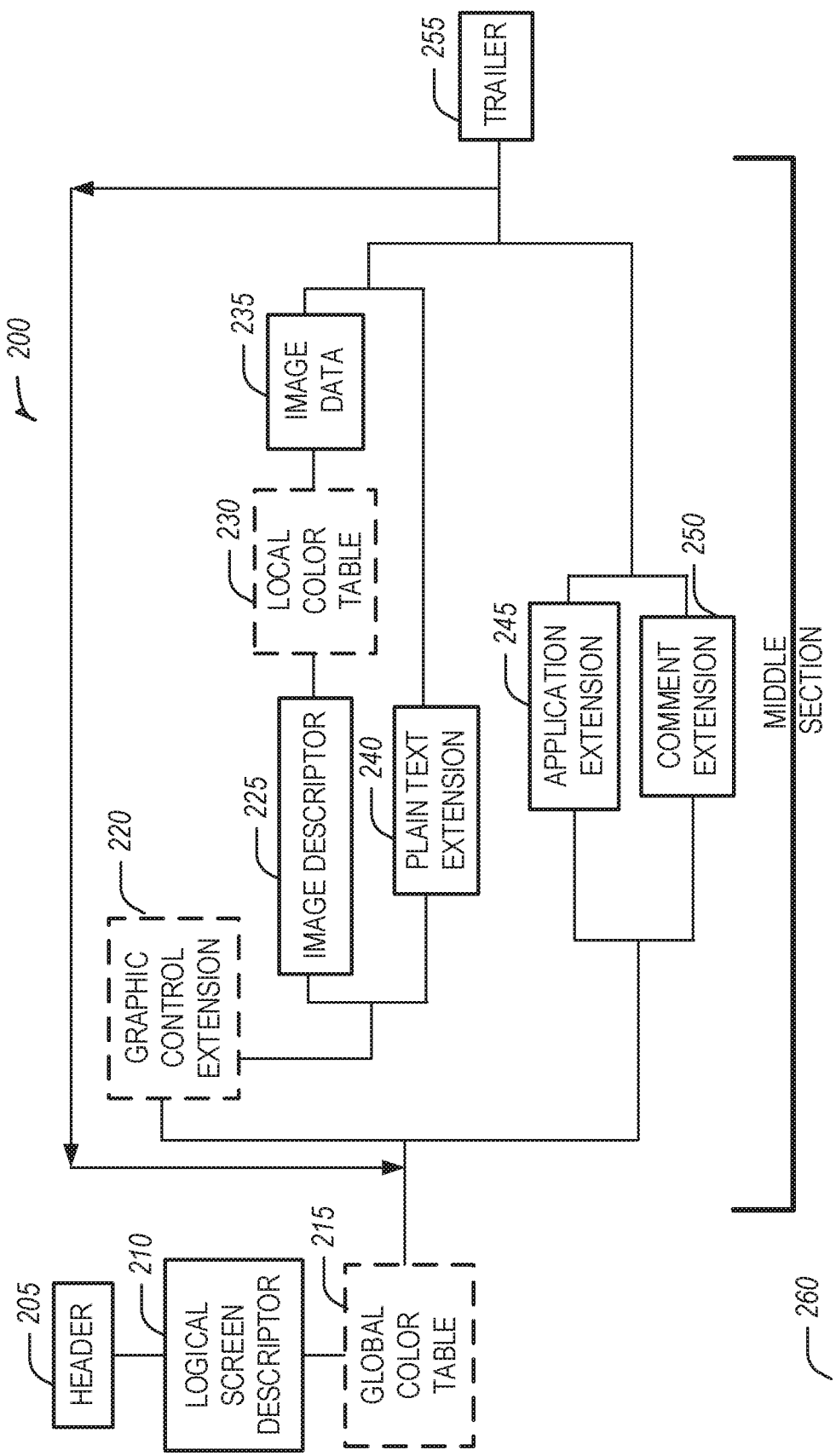
FIG. 2 illustrates a block structure of a GIF file, in accordance with some embodiments.

FIG. 2 illustrates a block structure 200 of a GIF file, in accordance with some embodiments. The block structure may include required blocks, which are designated with a solid line, and optional blocks, which are designated by a dashed line, as indicated by key 260. The information stored in these blocks is encoded into a GIF file. Thus, if a GIF file is decoded, it indicates the process of reading the block information of the GIF file. A GIF file starts with a header 205. The header 205 is six bytes and indicates that the file is a GIF and the GIF version, such as GIF87a or GIF89a. The logical screen descriptor 210 follows the header and includes information about how big the GIF is, such as the canvas size and the pixel aspect ratio. The GIF file may have either a global color table 215 or a local color table 230 for each frame in an animated GIF. The global color table 215 includes data such as the red-green-blue color intensities. A GIF file finishes with a trailer 255, which indicates the end of the tile has been reached.

Between the global color table 215 (or the logical screen descriptor 210 if the global color table 215 is not present) and the trailer 255 is the middle section of the GIF file. The middle section may be repeated, such as in an animated GIF file. The graphic control extension 220 specifies the transparency settings and controls animations. The image descriptor 225 includes information such as the image height and width, as well as the image position, as the image may not take up the whole canvas as designated in the logical screen descriptor 210. The local color table 230 is similar to the global color table 215, but used for each image of an animated GIF file. The image data 235 includes the information of where colors should be positioned on the canvas to generate the image. The plain text extension 240 provides for text captions to be overlaid onto the image, depending on the GIF version.

The GIF89 version specification provides for application specific information to be encoded into the GIF. The application specific information is included in the application extension 245. The GIF89 version specification provides for a comment extension 250. Text may be encoded into the comment extension 250, such as an image description or a creator credit.

FIGS. 3A-3D illustrate the four types of disposal methods used with animated GIFs, in accordance with some embodiments. To reduce the data size of an animated GIF, each image frame of the animated GIF may be reduced to only the portions of the image which differ from one or more previous image frames. A disposal method is part of the metadata encoded into each image frame to indicate what to do with the frame when displaying the next frame. There are four types of disposal methods: Unspecified (Nothing), Do Not Dispose (Leave As Is), Restore to Background, and Restore to Previous.

FIG. 3A illustrates the Unspecified disposal method, in accordance with some embodiments. The Unspecified disposal method replaces the previous frame with the whole next frame. Frame 1 305 illustrates a smiling face with a diagonally shaded background. Frame 2 310 illustrates a frowning face with a diagonally shaded background. With the Unspecified disposal method, the entire non-transparent frame 2 310 replaces frame 1 305 to produce the frame 2—result 315.

FIG. 3B illustrates the Do Not Dispose disposal method, in accordance with some embodiments. The Do Not Dispose disposal method, any pixels of the previous frame not designated to be replaced by the new frame are shown through in the resultant frame, thus parts of the new frame are transparent. Frame 1 320 illustrates a smiling face with a diagonally shaded background. Frame 2 325 illustrates the frown of the frowning face (as illustrated in frame 2 315) and the diagonally shaded background, while the rest of the frame is transparent. The diagonally shaded background of frame 2 325 is not transparent. The portion of frame 2 325 which differs from frame 1 320 and will replace pixels of frame 1 320, but the rest of frame 2 325 (the non-shaded area) is transparent and will allow the pixels in that area from frame 1 320 to display. Frame 2—result 330 illustrates the resulting second frame using the Do Not Dispose disposal method where pixels of frame 1 320 which were not replaced by pixels of frame 2 325 continue to display.

Figure 3C:
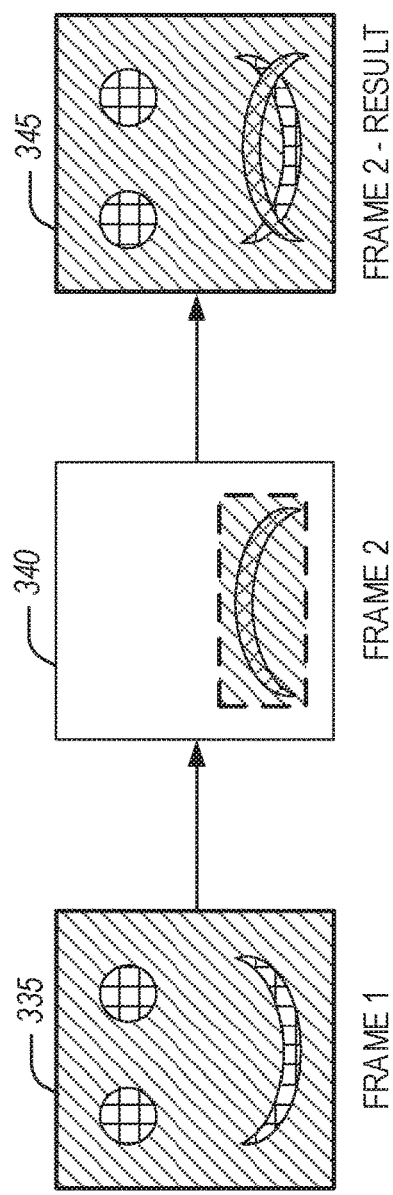

FIG. 3C illustrates the Restore to Background disposal method, in accordance with some embodiments. The Restore to Background disposal method allows the background color or background tile to show through the transparent pixels of the new frame. Frame 1 335 illustrates a smiling face with a diagonally shaded background. Frame 2 340 illustrates just the frown of the frowning face (as illustrated in frame 2 315) and the diagonally shaded background. The diagonally shaded background of frame 2 340 is transparent. The portions of frame 2 340 designated as transparent, as well as the background color of frame 2 340, are transparent and allow those pixels of frame 1 335 to be displayed. Frame 2 result 345 illustrates the result of the Restore to Background disposal method where the smile of frame 1 335 is visible under the frown of frame 2 340 because the background of frame 2 340 is transparent, and thus Frame 1 335 is the background displayed.

Figure 3D:
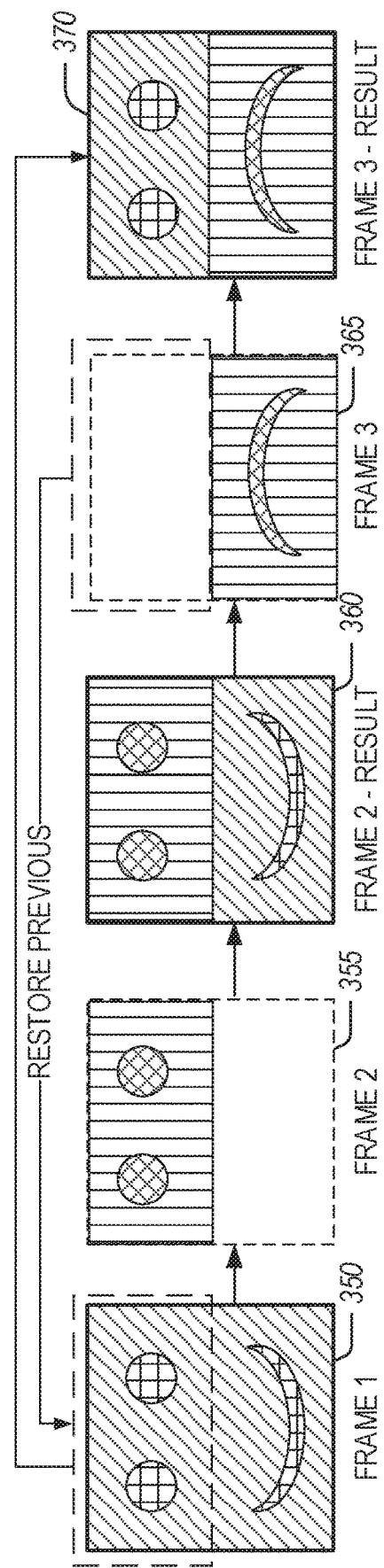

FIG. 3D illustrates the Restore to Previous disposal method, in accordance with some embodiments. The Restore to Previous disposal method restores to the state of a previous, undisposed frame. Frame 1 350 illustrates a smiling face with a diagonally shaded background. Frame 2 355 illustrates as set of eyes with a vertical stripe background, with the bottom half of the frame transparent. Frame 1 350 has a disposal method of Do Not Dispose, and thus the bottom half of frame 1 350 is displayed for the resulting frame 2—result 360 comprising the top half of frame 2 355 and the bottom half of frame 1 350. Frame 3 365 illustrates a frown with a vertical stripe background and a transparent top half. Frame 2 355 has a disposal method of Restore to Previous. Thus, for the transparent portion of frame 3 365, the frame previous to frame 2 355 is displayed through the transparency of frame 3 365. Frame 3—result 370 illustrates the result of the Restore to Previous disposal method with the bottom half of frame 3 365 and the top half of frame 1 350, even though the top half of frame 1 350 was not present in frame 2—result 360.

Transparency is an important aspect of optimizing an animated GIF. When an animated GIF is created or re-encoded, any color may be chosen as the color set as transparent in the beginning of animated GIF frame.

Online hosting services and social networks may provide for users to upload content such as images and videos, including animated GIF. As previously noted, storing animated GIFs, including multiple sizes of animated GIFs for multiple platforms, may require a large amount of data storage space. Thus to solve this technical challenge, technical solutions to reduce the data size of animated GIFs are needed. When a user uploads an animated GIF, it is unknown if and how the animated GIF may be optimized to utilize the proper disposal methods and reduce the overall data size of the animated GIF. A user uploaded animated GIF may not utilize any disposal method. Thus, it may be beneficial for the hosting service to analyze the animated. GIF and determine if more optimal disposal methods may be encoded into the animated GIF to reduce the data size of the animated GIF and its variations.

When attempting to optimize the animated GIF, another technical issue arises as the process requires a large amount of memory. While the data size of an animated GIF is typically not prohibitively large, when the animated GIF is decoded and broken out frame by frame, which includes decompressing the image, the footprint in the computer memory becomes quite large. Depending on the number of frames in the animated GIF, and the number of animated GIFs being processed, if all the frames are uncompressed at once, it may easily overload the memory of the computing system. Animated GIF optimization, including determining an optimal disposal method and pixel transparency, at an on the fly or a frame by frame process may avoid memory overload and processing slowdowns.

Employment and job training products and services, such as LinkedIn Learning, may help customers and users learn business, creative, and technology skills to achieve their personal and professional goals. These products and services may rely on animated GIFs to demonstrate aspects of the course inside an application or webpage. These products and services may include video-based courses. An animated GIF may be used to show highlights and summaries of these videos. For accessibility, these products and services may have requirements to serve a variety of devices and network conditions. To provide for the variety of devices and network conditions, an original animated GIF may be tailored to different resolutions and sizes. The methods and techniques described herein for animated GIF optimization may manage such requirements. A traditional image processing node may have limited resources and a traditional animated GIF processing strategy may easily drain the resources on the processing node. The methods and techniques described herein for animated GIF optimization may overcome these limitations and provide timely response for employment and job training products and services, such as LinkedIn Learning.

Disclosed in some examples is a process to receive and decode two ordered frames at a time from the set of frames of an animated GIF and optimize the frames based on the disposal method and transparency. The process may move through all the frames of the animated GIF, two at a time. For example, first the first and second frames are received to determine optimization, then followed by the second and third frame, then the third and fourth frame, and so on. The process may analyze the disposal method and transparency of a frame before optimization. The process may determine if a more optimal disposal method may be used and if the transparency may be augmented to reduce the data size of the frame.

The methods and techniques described herein may operate without the entire animated GIF file being immediately available. The methods and techniques described here may read a data stream of the animated GIF and process the components in the order of arrival. For example, the animated GIF header may be determined from the first six bytes and the logical screen descriptor (LSD) may be determined afterward.

The methods and techniques described herein may parse an animated GIF one frame at a time. This may reduce the memory space required during the process to determine the disposal method. Other approaches may load the entire animated GIF into memory, which may exceed the available host memory. This may be significantly slower as all the animated GIF image data is buffered before an optimization process may begin. The methods and techniques described herein may process and encode a frame immediately after the frame is decoded. For the functionality of the methods and techniques described herein, a previous frame of the animated GIF may be stored in memory. Thus, only two frames may be stored in memory at the same time, regardless of the number of frames in the animated GIF.

The methods and techniques described herein for an animated GIF frame optimizer use the transparency and the disposal method together to optimize the image data size. For example, an animated GIF may be a spinning globe on a blue background. When the animated GIF is constructed, the animated GIF designers may include the blue background as part of every frame and replace the entire image with each frame. Instead, if the blue background is set to transparent and the disposal method is set to Revert to Background, the file size of each frame is reduced and it may improve the performance of the animation.

Figure 4:
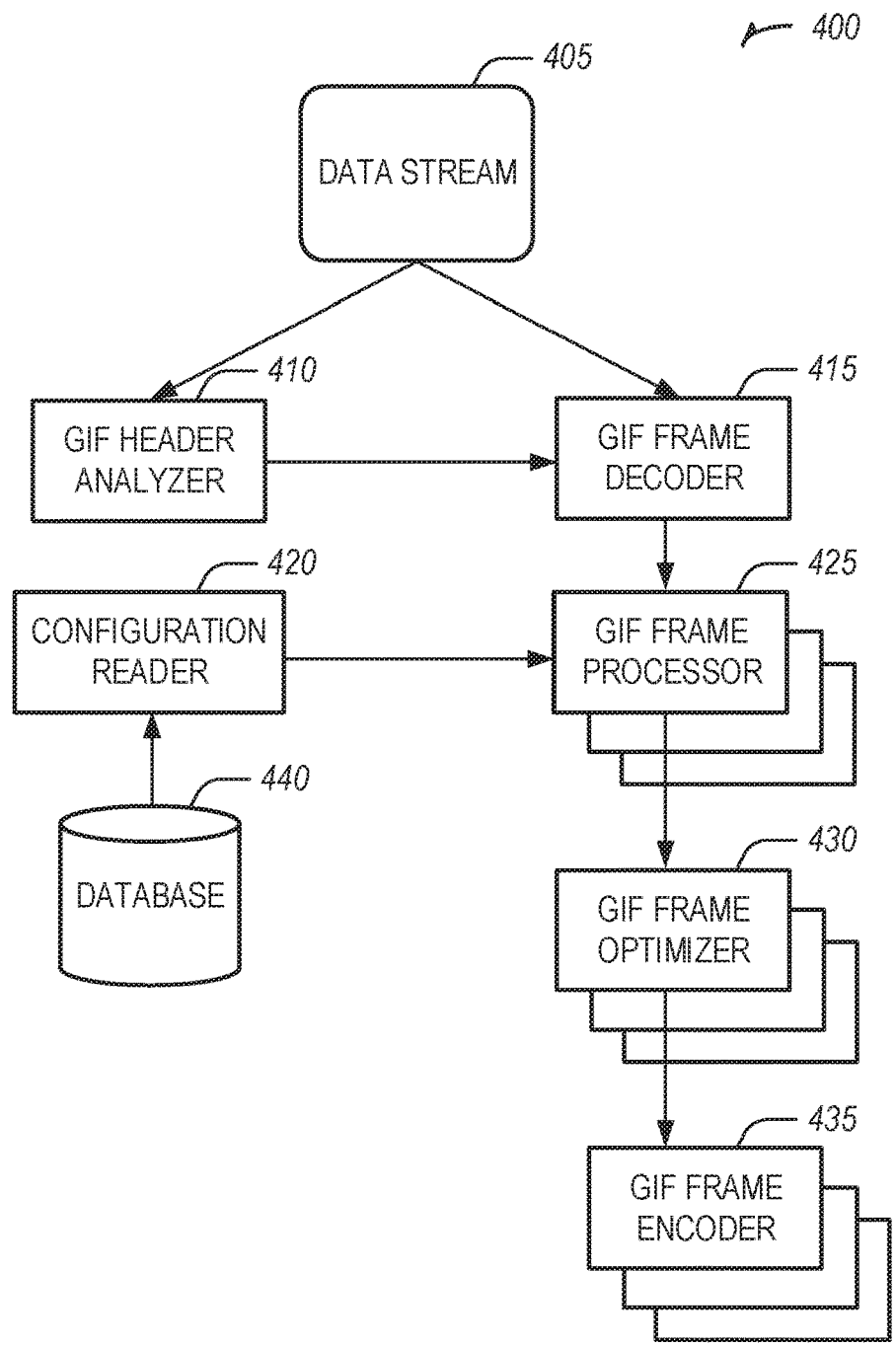
FIG. 4 illustrates an example system overview for the animated GIF optimizer, in accordance with some embodiments.

FIG. 4 illustrates an example system overview 400, showing a data flow for the animated GIF optimizer, in accordance with some embodiments. The data stream 405 may be an incoming animated GIF data file. The input data stream 405 may first be analyzed through the GIF header analyzer 410. The GIF header analyzer 410 may read the metadata held in the header for the animated GIF, such as the logical screen width and height, and the frame information. The metadata extracted from the header may then be sent to the GIF frame decoder 415, including data such as the color table. The GIF frame decoder 415 also receives the data stream 405. The GIF frame decoder 415 reads the frame data and decodes the frame with the LZW algorithm.

The configuration reader 420 reads from a data storage location, such as a database 440, the configurations of animated GIFs. The configurations may specify animated GIF properties such as the image pixel size, the color depth, and maximum data file size. The configurations determine the properties for each of the output animated GIFs based on the input animated GIF from the data stream 405. The configuration reader 420 parses the configurations to determine the output properties and sends this data to the GIF frame processor 425.

The GIF frame processor 425 receives the decoded frame data from the GIF frame decoder 415 and the configuration data from the configuration reader 420. The GIF frame processor 425 starts a thread pool based on each configuration. When the GIF frame processor 425 starts each thread, it may write a header first before processing a frame. The GIF frame processor 425 may process the frame data according to the configuration, such as resizing each frame and padding the entire animated GIF.

The frame data of each thread then moves to the GIF frame optimizer 430. The GIF frame optimizer 430 incorporates a frame by frame optimization to reduce the possible file size and is explained in FIG. 5. The GIF frame encoder 435 encodes the optimized frame according to LZW algorithm and assembles the optimized animated GIF for each thread.

Figure 5:
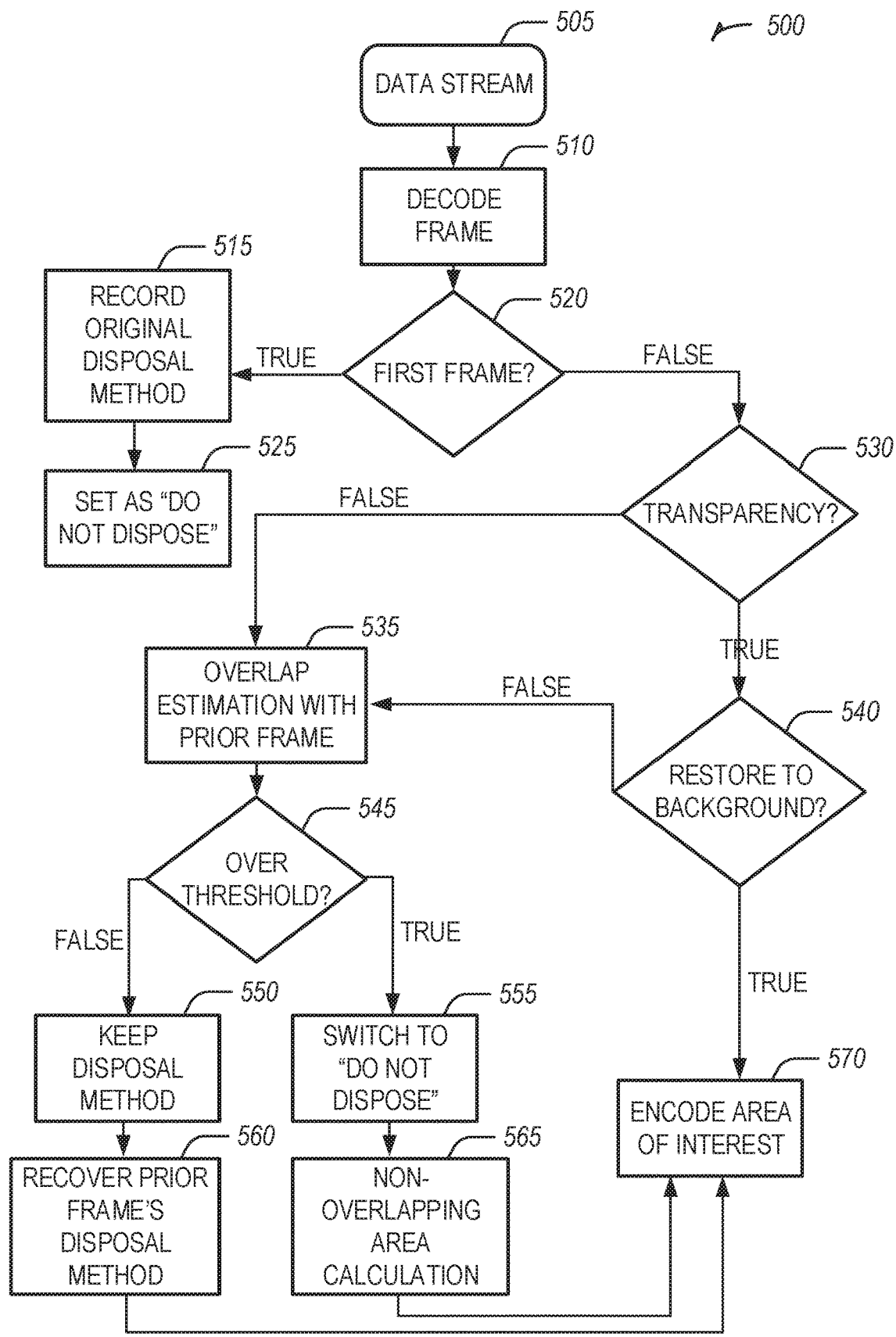
FIG. 5 illustrates an example process for the animated GIF frame optimizer, in accordance with some embodiments.

FIG. 5 illustrates an example process 500 for the animated GIF frame optimizer, in accordance with some embodiments. The process 500 is part of the flow of system 400 at the GIF frame optimizer 430 stage. The process 500 explores the disposal method and transparency setting in the GIF protocol to minimize the bytes that are saved. In some examples, the process 500 performs with only two frames at a time from the animated GIF which reduces the memory footprint and reduces memory the possibility of overloading the memory. A frame from the animated GIF is received through the data stream 505. The frame is decoded at operation 510 to extract metadata from the frame, such as the current disposal method.

At decision 520, the frame optimizer determines if the frame is the first frame. If the frame is the first frame, at operation 515 the disposal method currently set for the frame is recorded. At operation 525, the disposal method for the first frame is set to Do Not Dispose temporarily. The first frame is set to the Do Not Dispose disposal method to keep the first frame for later usage. When the second frame is optimized, then it is possible to check if a significant portion of the first frame may be reused.

At decision 520, if it is determined it is not the first frame, then at decision 530 it is determined if there are any transparent pixels in the frame. If it is determined that the frame does have transparent pixels, then at decision 540 it is determined if the disposal method as stored in the metadata for the frame is set to Restore to Background. If it is determined the disposal method is set to Restore to Background, the frame is directly encoded as no further optimization is necessary.

At decision 530, if it is determined that the frame does not have any transparent pixels, or at decision 540, if it is determined that the disposal method is not set to Restore to Background, then the frame optimization moves to operation 535. At operation 535, an overlap estimation with the prior frame is performed. The operation 535 estimates the overlapping area between the current frame and the prior frame, where an overlap is any pixel which is the same in both the current frame and the prior frame. The pixels determined to be non-overlapping, may be considered the area of interest for the frame. At decision 545, it is determined if the amount of overlap between the two frames is over a threshold. The threshold may be a percentage of overlap between the two images. The threshold may be a value set by a user and dependent on the degree of optimization the user desires. The threshold may be a relatively low percentage, such as 10%, indicating that there are so few similarities between the current and prior frame that optimization may not be recognizably beneficial.

At decision 545, if it is determined the estimated overlap is not over the threshold, then at operation 550 the current disposal method for the frame is retained. At operation 560, the prior frame's disposal method is recovered, if necessary, and the frame moves to operation 570 to encode the area of interest for the frame. A frame that has followed this path of the process is not necessarily a frame with a low percentage of transparent pixels. Instead, this path has simply determined that the frame is currently optimized within the range determined by the threshold amount.

At decision 545, if it is determined the estimated overlap with the prior frame is over the threshold value, then at operation 555, the disposal method is set to Do Not Dispose. The Do Not Dispose disposal method indicates that any pixels not covered by the next frame may continue to display. At operation 565, the non-overlapping area is calculated. This includes determining every pixel in the current frame which is different than the same pixel in the prior frame. This calculation identifies the area of interest. Any pixel not identified as part of the area of interest is set as transparent. The area of interest for the frame is encoded at operation 570 with the rest of the pixels set as transparent and the disposal method set as Do Not Dispose.

For large scale processing, the animated GIF optimizer may use a state tracking scheme. Before the processing begins, an empty output token is generated for each intended output. The intended outputs may correspond with a configuration. As the animated GIF is processed with the thread pool based on each configuration, each thread changes the status of the output token. This may be used to prevent conflicts, especially in a distributed environment.

The animated GIF optimization technique may be used for large scale distributed media processing infrastructures. It may be integrated into a distributed state management system and scaled to hundreds of processing nodes.

The techniques and methods for animated GIF optimization described herein may provide for distributed or parallel processing of the animated GIF. As the optimization process uses only two frames at a time, it is possible to divide the processing of the animated GIF. For example, the set of frames of the animated GIF may be divided into multiple subsets. Each subset may be processed concurrently with all the subsets being joined together at the end with a reconciliation process for the frames which occur at the ends of each subset. The process of performing the optimization for a variety of sizes for the animated (such as a size for mobile and a size for high definition) may be performed in parallel. As noted, decoding the whole animated GIF into memory may overload the memory, and thus it would not be possible to hold multiple versions of the decoded animated GIF in memory. With the animated GIF optimization process, only two frames are held in memory at one time, thus it may be possible to hold two images of each desired size in memory without overloading the memory.

Figure 6:
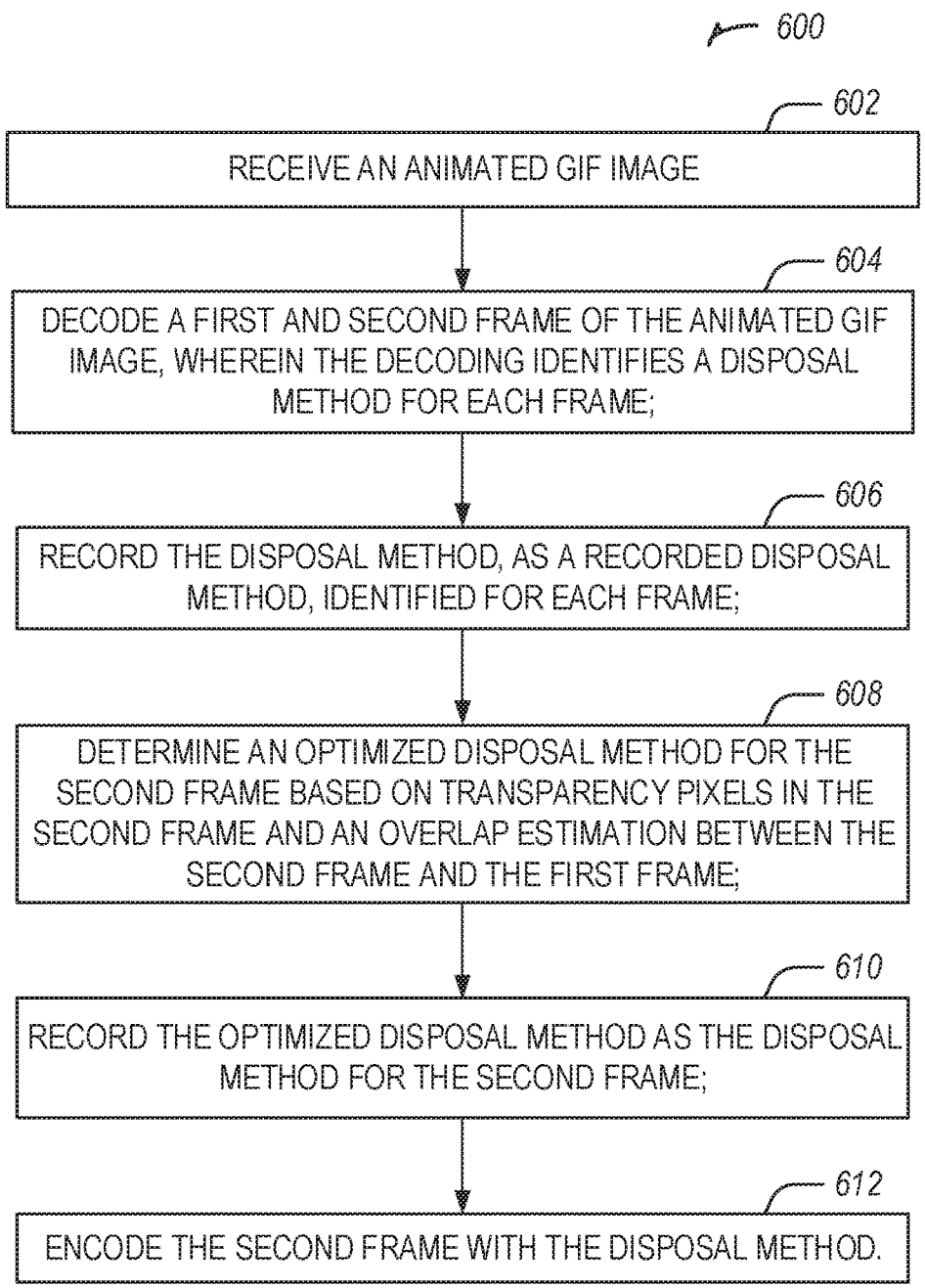
FIG. 6 illustrates a flowchart showing a technique for animated GIF optimization in accordance with some embodiments.

FIG. 6 illustrates a flowchart showing a technique 600 for optimizing an animated GIF in accordance with some embodiments. The technique 600 includes an operation 602 to receive an animated GIF image. The animated GIF may be received as a data stream from a data storage device. The technique 600 includes an operation 604 to decode a first and a second frame of the animated GIF image, wherein the decoding identifies a disposal method for each frame. The first and second frame may be stored in memory. The operation may hold only two frames at a time in memory to reduce the memory footprint and reduce the risk of overloading the memory. The technique 600 includes an operation 606 to record the disposal method, as a recorded disposal method, identified for each frame. The current disposal method associated with each frame may be temporarily stored in memory.

The technique 600 includes an operation 608 to determine an optimized disposal method for the second frame based on transparency pixels in the second frame and an overlap estimation between the second frame and the first frame. The optimized disposal method for the second frame may be determined based on comparing the overlap estimation to a predetermined threshold. The overlap estimation may calculate a percentage of pixels in the second frame which differ from corresponding pixels in the first frame. The optimized disposal method may be set to the recorded disposal method if the overlap estimation does not exceed the threshold. This may indicate that the frame is optimized sufficiently. The optimized disposal method may replace the recorded disposal method if the overlap estimation exceeds the threshold. If the overlap estimation exceeds the threshold, this may indicate the frame is not optimized. Thus, the disposal method for the frame may be set to Do Not Dispose and the area of interest may be determined. The technique 600 further includes an operation to identify pixels in an area of interest. The area of interest may be pixels in the second frame which differ from corresponding pixels in the first frame. The technique 600 further includes an operation to designate pixels outside the area of interest as transparent. The technique 600 further includes an operation to encode the area of interest and the pixels designated as transparent for the second frame.

The process may determine the frame is optimized sufficiently within the bounds specified by the optimization process, thus the recorded disposal method may be retrieved from memory and encoded with the frame. For example, if the frame includes transparent pixels and has a disposal method of Dispose to Background, then the frame is fully optimized.

The technique 600 includes an operation 610 to record the optimized disposal method as the disposal method for the second frame. The technique 600 includes an operation 612 to encode the second frame with the disposal method. If an area of interest has been determined, then the second frame may be encoded with the area or interest with the remaining pixels recorded as transparent.

The technique 600 may further include operations to decode a third frame of the animated GIF image with the decoding identifying the disposal method for the third frame. The operations further include to record the disposal method, as the recorded disposal method, identified for the third frame and to determine the optimized disposal method for the third frame based on transparency pixels in the third frame and the overlap estimation between the third frame and the second frame. The operations further include to record the optimized disposal method as the disposal method for the third frame and to encode the third frame with the disposal method.

Figure 7:
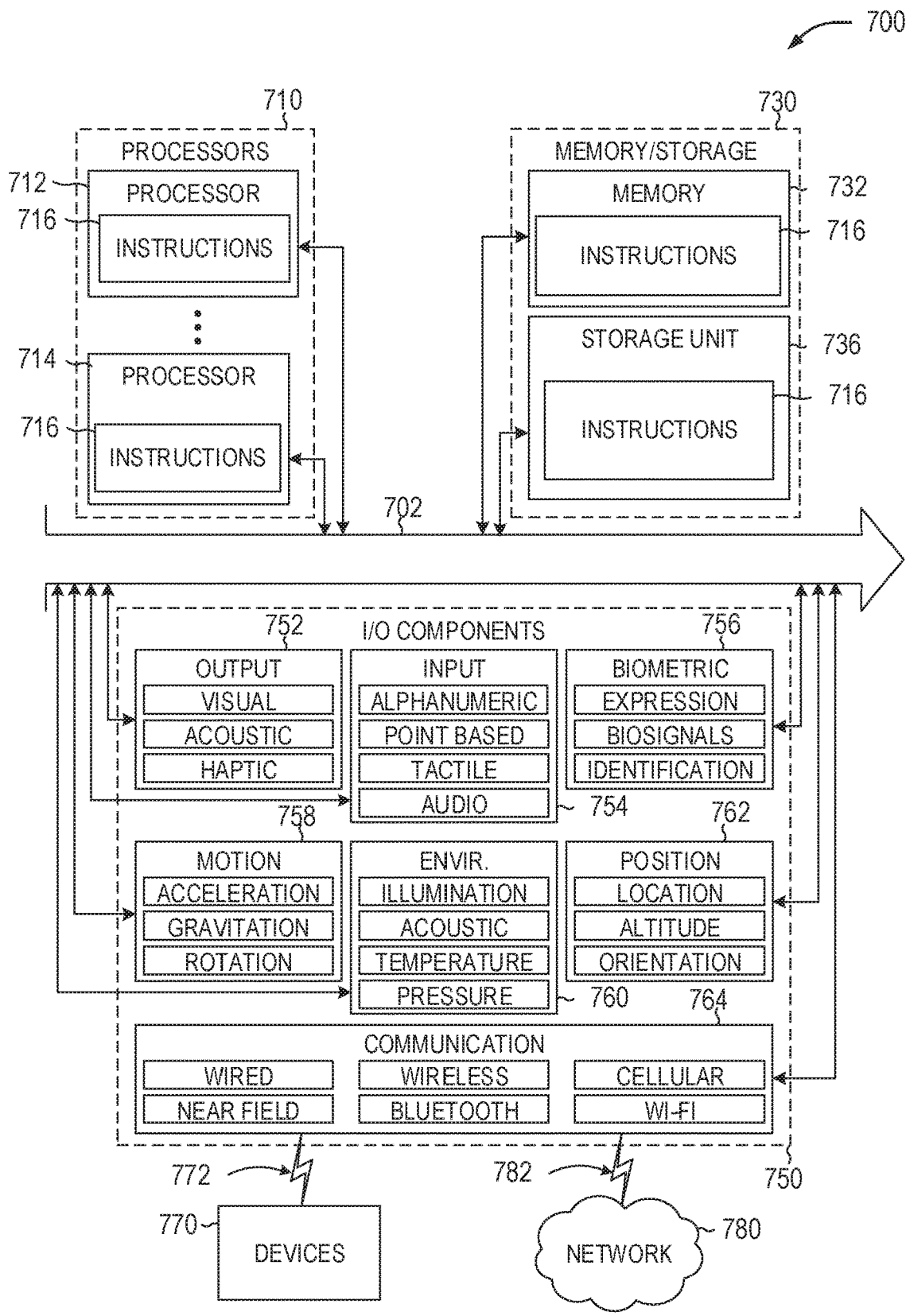
FIG. 7 is a block diagram illustrating an example of a machine upon which one or more embodiments may be implemented.

FIG. 7 is a block diagram illustrating components of a machine 700 which according to some example embodiments is able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. The instructions 716 transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. For example, in addition to a speaker, the output components 752 may include a visual output device adapted to provide augmented visual colors, animations, and presentation of information that is determined to best communicate and improve the user's mood to an optimal state as described herein. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure bio-signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer temperature sensor components (e.g., one or more thermometers that detect ambient temperature), humidity sensor components, pressure sensor components (e.g., barometer), acoustic sensor components (e.g., one or more microphones that detect background noise), proximity sensor components e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components, or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

In various example embodiments, one or more portions of the network 780 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third. Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Example 1 is a method for optimization of an animated image encoded in a Graphic Interchange Format (GIF) comprising: receiving an animated GIF image; decoding a first and second frame of the animated GIF image, wherein the decoding identifies a disposal method for each frame; recording the disposal method, as a recorded disposal method, identified for each frame; determining an optimized disposal method for the second frame based on transparency pixels in the second frame and an overlap estimation between the second frame and the first frame; recording the optimized disposal method as the disposal method for the second frame; encoding the second frame with the disposal method.

In Example 2, the subject matter of Example 1 includes, wherein the overlap estimation calculates a percentage of pixels in the second frame which differ from corresponding pixels in the first frame.

In Example 3, the subject matter of Examples 1-2 includes, wherein the optimized disposal method for the second frame is determined based on comparing the overlap estimation to a threshold.

In Example 4, the subject matter of Example 3 includes, wherein the optimized disposal method is set to the recorded disposal method if the overlap estimation does not exceed the threshold.

In Example 5, the subject matter of Examples 3-4 includes, wherein the optimized disposal method replaces the recorded disposal method if the overlap estimation exceeds the threshold.

In Example 6, the subject matter of Example 5 includes, identifying pixels in an area of interest, wherein the area of interest is pixels in the second frame which differ from corresponding pixels in the first frame; designating pixels outside the area of interest as transparent; and encoding the area of interest and the pixels designated as transparent for the second frame.

In Example 7, the subject matter of Examples 1-6 includes, decoding a third frame of the animated GIF image, wherein the decoding identifies the disposal method for the third frame; recording the disposal method, as the recorded disposal method, identified for the third frame; determining the optimized disposal method for the third frame based on transparency pixels in the third frame and the overlap estimation between the third frame and the second frame; recording the optimized disposal method as the disposal method for the third frame; encoding the third frame with the disposal method.

Example 8 is a system for optimization of an animated image encoded in a Graphic Interchange Format (GIF) comprising: at least one processor; and memory including instructions that, when executed by the at lest one processor, cause the at least one processor to: receive an animated GIF image; decode a first and second frame of the animated GIF image, wherein the decoding identifies a disposal method for each frame; record the disposal method, as a recorded disposal method, identified for each frame; determine an optimized disposal method for the second frame based on transparency pixels in the second frame and an overlap estimation between the second frame and the first frame; record the optimized disposal method as the disposal method for the second frame; encode the second frame with the disposal method.

In Example 9, the subject matter of Example 8 includes, wherein the overlap estimation calculates a percentage of pixels in the second frame which differ from corresponding pixels in the first frame.

In Example 10, the subject matter of Examples 8-9 includes, wherein the optimized disposal method for the second frame is determined based on comparing the overlap estimation to a threshold.

In Example 11, the subject matter of Example 10 includes, wherein the optimized disposal method is set to the recorded disposal method if the overlap estimation does not exceed the threshold.

In Example 12, the subject matter of Examples 10-11 includes, wherein the optimized disposal method replaces the recorded disposal method if the overlap estimation exceeds the threshold.

In Example 13, the subject matter of Example 12 includes, instruction to: identify pixels in an area of interest, wherein the area of interest is pixels in the second frame which differ from corresponding pixels in the first frame; designate pixels outside the area of interest as transparent; and encode the area of interest and the pixels designated as transparent for the second frame.

In Example 14, the subject matter of Examples 8-13 includes, instructions to: decode a third frame of the animated GIF image, wherein the decoding identifies the disposal method for the third frame; record the disposal method, as the recorded disposal method, identified for the third frame; determine the optimized disposal method for the third frame based on transparency pixels in the third frame and the overlap estimation between the third frame and the second frame; record the optimized disposal method as the disposal method for the third frame; encode the third frame with the disposal method.

Example 15 is at least one non-transitory computer readable medium including instructions for optimization of an animated image encoded in a Graphic Interchange Format (GIF) that when executed by at least one processor, cause the at least one processor to: receive an animated GIF image; decode a first and second frame of the animated GIF image, wherein the decoding identifies a disposal method for each frame; record the disposal method, as a recorded disposal method, identified for each frame; determine an optimized disposal method for the second frame based on transparency pixels in the second frame and an overlap estimation between the second frame and the first frame; record the optimized disposal method as the disposal method for the second frame; encode the second frame with the disposal method.

In Example 16, the subject matter of Example 15 includes, wherein the optimized disposal method for the second frame is determined based on comparing the overlap estimation to a threshold.

In Example 17, the subject matter of Example 16 includes, wherein the optimized disposal method is set to the recorded disposal method if the overlap estimation does not exceed the threshold.

In Example 18, the subject matter of Examples 16-17 includes, wherein the optimized disposal method replaces the recorded disposal method if the overlap estimation exceeds the threshold.

In Example 19, the subject matter of Example 18 includes, instruction to: identify pixels in an area of interest, wherein the area of interest is pixels in the second frame which differ from corresponding pixels in the first frame; designate pixels outside the area of interest as transparent; and encode the area of interest and the pixels designated as transparent for the second frame.

In Example 20, the subject matter of Examples 15-19 includes, instructions to: decode a third frame of the animated GIF image, wherein the decoding identifies the disposal method for the third frame; record the disposal method, as the recorded disposal method, identified for the third frame; determine the optimized disposal method for the third frame based on transparency pixels in the third frame and the overlap estimation between the third frame and the second frame; record the optimized disposal method as the disposal method for the third frame; encode the third frame with the disposal method.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for optimization of an animated image encoded in a Graphic Interchange Format (GIF), comprising:
   receiving an animated GIF image;
   decoding a first frame and a second frame of the animated GIF image, wherein the decoding identifies an animated GIF disposal method for each frame;
   recording the animated GIF disposal method, as a recorded disposal method, identified for each frame;
   selecting an optimized disposal method from a plurality of animated GIF disposal methods for the second frame based on transparency pixels in the second frame and an overlap estimation between the second frame and the first frame, wherein the optimized disposal method for the second frame is selected based on comparing the overlap estimation to a threshold;
   recording the optimized disposal method as the recorded disposal method for the second frame, based on the overlap estimation exceeding the threshold;
   encoding the second frame with the recorded disposal method.

2. The method of claim 1, wherein the overlap estimation calculates a percentage of pixels in the second frame which differ from corresponding pixels in the first frame.

3. The method of claim 1, further comprising:
   identifying pixels in an area of interest, wherein the area of interest is pixels in the second frame which differ from corresponding pixels in the first frame;
   designating pixels outside the area of interest as transparent; and
   encoding the area of interest and the pixels designated as transparent for the second frame.

4. The method of claim 1, further comprising:
   decoding a third frame of the animated GIF image, wherein the decoding identifies the animated GIF disposal method for the third frame;
   recording the animated GIF disposal method, as the recorded disposal method, identified for the third frame;
   selecting the optimized disposal method from the plurality of animated GIF disposal methods for the third frame based on transparency pixels in the third frame and the overlap estimation between the third frame and the second frame;
   recording the optimized disposal method as the recorded disposal method for the third frame;

encoding the third frame with the recorded disposal method.

5. The method of claim 4, wherein the optimized disposal method is set to the recorded disposal method based on the overlap estimation not exceeding the threshold.

6. A system for optimization of an animated image encoded in a Graphic Interchange Format (GIF), comprising:
at least one processor; and
memory including instructions that, when executed by the at least one processor, cause the at least one processor to:
receive an animated GIF image;
decode a first frame and a second frame of the animated GIF image, wherein the decoding identifies an animated GIF disposal method for each frame;
record the animated GIF disposal method, as a recorded disposal method, identified for each frame;
select an optimized disposal method from a plurality of animated GIF disposal methods for the second frame based on transparency pixels in the second frame and an overlap estimation between the second frame and the first frame, wherein the optimized disposal method for the second frame is selected based on comparing the overlap estimation to a threshold;
record the optimized disposal method as the recorded disposal method for the second frame, based on the overlap estimation exceeding the threshold;
encode the second frame with the recorded disposal method.

7. The system of claim 6, wherein the overlap estimation calculates a percentage of pixels in the second frame which differ from corresponding pixels in the first frame.

8. The system of claim 6, further comprising instruction to:
identify pixels in an area of interest, wherein the area of interest is pixels in the second frame which differ from corresponding pixels in the first frame;
designate pixels outside the area of interest as transparent; and
encode the area of interest and the pixels designated as transparent for the second frame.

9. The system of claim 6, further comprising instructions to:
decode a third frame of the animated GIF image, wherein the decoding identifies the animated GIF disposal method for the third frame;
record the animated GIF disposal method, as the recorded disposal method, identified for the third frame;
selecting the optimized disposal method from the plurality of animated GIF disposal methods for the third frame based on transparency pixels in the third frame and the overlap estimation between the third frame and the second frame;
record the optimized disposal method as the recorded disposal method for the third frame;
encode the third frame with the recorded disposal method.

10. The system of claim 9, wherein the optimized disposal method is set to the recorded disposal method based on the overlap estimation not exceeding the threshold.

11. At least one non-transitory computer readable medium including instructions for optimization of an animated image encoded in a Graphic Interchange Format (GIF) that when executed by at least one processor, cause the at least one processor to:
receive an animated GIF image;
decode a first frame and a second frame of the animated GIF image, wherein the decoding identifies an animated GIF disposal method for each frame;
record the animated GIF disposal method, as a recorded disposal method, identified for each frame;
select an optimized disposal method from a plurality of animated GIF disposal methods for the second frame based on transparency pixels in the second frame and an overlap estimation between the second frame and the first frame, wherein the optimized disposal method for the second frame is selected based on comparing the overlap estimation to a threshold;
record the optimized disposal method as the recorded disposal method for the second frame, based on the overlap estimation exceeding the threshold;
encode the second frame with the recorded disposal method.

12. The at least one computer readable medium of claim 11, further comprising instruction to:
identify pixels in an area of interest, wherein the area of interest is pixels in the second frame which differ from corresponding pixels in the first frame;
designate pixels outside the area of interest as transparent; and
encode the area of interest and the pixels designated as transparent for the second frame.

13. The at least one computer readable medium of claim 11, further comprising instructions to:
decode a third frame of the animated GIF image, wherein the decoding identifies the animated GIF disposal method for the third frame;
record the animated GIF disposal method, as the recorded disposal method, identified for the third frame;
select the optimized disposal method from the plurality of animated GIF disposal methods for the third frame based on transparency pixels in the third frame and the overlap estimation between the third frame and the second frame;
record the optimized disposal method as the recorded disposal method for the third frame;
encode the third frame with the recorded disposal method.

14. The at least one computer readable medium of claim 13, wherein the optimized disposal method is set to the recorded disposal method based on the overlap estimation not exceeding the threshold.

* * * * *